(12) United States Patent
Lee et al.

(10) Patent No.: US 7,724,904 B2
(45) Date of Patent: May 25, 2010

(54) AUTHENTICATION SYSTEM AND METHOD THEREOF IN A COMMUNICATION SYSTEM

(75) Inventors: Ji-Cheol Lee, Yongin-si (KR); Jun-Hyuk Song, Anyang-si (KR)

(73) Assignee: Samsung Electronics Co., Ltd (KR)

( * ) Notice: Subject to any disclaimer, the term of this patent is extended or adjusted under 35 U.S.C. 154(b) by 997 days.

(21) Appl. No.: 11/478,830

(22) Filed: Jun. 30, 2006

(65) Prior Publication Data

US 2007/0016780 A1    Jan. 18, 2007

(30) Foreign Application Priority Data

Jul. 2, 2005    (KR) .................... 10-2005-0059495

(51) Int. Cl.
*H04M 1/66* (2006.01)
*H04L 9/00* (2006.01)

(52) U.S. Cl. .............. 380/270; 380/260; 713/169; 455/411

(58) Field of Classification Search ......... 709/227–229, 709/225; 713/168, 171; 455/410–411; 380/247–259, 380/260–262, 44–47; 340/5.8; 726/2, 3–5, 726/10, 27–29
See application file for complete search history.

(56) References Cited

U.S. PATENT DOCUMENTS

| | | | |
|---|---|---|---|
| 2004/0010713 A1* | 1/2004 | Vollbrecht et al. | 713/201 |
| 2005/0081036 A1 | 4/2005 | Hsu | |
| 2005/0138355 A1 | 6/2005 | Chen et al. | |
| 2007/0003062 A1* | 1/2007 | Mizikovsky et al. | 380/270 |
| 2007/0005972 A1* | 1/2007 | Mizikovsky et al. | 713/171 |
| 2007/0217610 A1* | 9/2007 | Yegani et al. | 380/270 |
| 2007/0297611 A1* | 12/2007 | Yun et al. | 380/270 |
| 2008/0192931 A1* | 8/2008 | Cho et al. | 380/258 |
| 2009/0019284 A1* | 1/2009 | Cho et al. | 713/170 |

FOREIGN PATENT DOCUMENTS

| | | |
|---|---|---|
| CN | 1547405 | 11/2004 |
| EP | 1528718 | 5/2005 |
| KR | 1020050053857 | 6/2005 |

(Continued)

OTHER PUBLICATIONS

Part 16: Air Interface for Fixed and Mobile Broadband Wireless Access Systems—Amendment for Physical and Medium Access Control Layers for Combined Fixed and Mobile Operation in Licensed Bands, IEEE Std P802.16e/D11, pp. 222-224, 2005.*

(Continued)

*Primary Examiner*—Gilberto Barron, Jr.
*Assistant Examiner*—Shaun Gregory
(74) *Attorney, Agent, or Firm*—The Farrell Law Firm, LLP

(57) ABSTRACT

An authentication method and system in a communication system are provided. An MS, a BS and an AAA server acquire a first MSK by a first EAP authentication for the MS in an EAP-in-EAP scheme. After the first EAP authentication, they acquire a second MSK by a second EAP authentication for the MS in the EAP-in-EAP scheme.

16 Claims, 6 Drawing Sheets

FOREIGN PATENT DOCUMENTS

| | | |
|---|---|---|
| KR | 1020050109685 | 11/2005 |
| RU | 2183051 | 5/2002 |
| WO | WO 2004/028071 A1 | 4/2004 |

OTHER PUBLICATIONS

IEEE C802.16e-05/344r2, Remedy of double EAP mode, Junhyuk Song, Jicheol Lee, Alper Yegin and Yoshihiro Ohba, Jul. 21, 2005, IEEE 802.16 Broadband Wireless Access Working Group.*

European Telecommunication Standard, Radio Equipment and Systems (RES); Trans-European Trunked Radio (TETRA); Packet Data Optimized (PDO); Part 7: Security, May 1997.

Seok-Heon Cho et al., Clarification on the Key Hierarchy for the PKMv2, IEEE 802.16 Broadband Wireless Access Working Group, Jun. 8, 2005.

* cited by examiner

AUTHENTICATION SYSTEM AND METHOD THEREOF IN A COMMUNICATION SYSTEM

PRIORITY

This application claims priority under 35 U.S.C. §119 to an application entitled "Authentication System and Method Thereof in A Communication System" filed in the Korean Intellectual Property Office on Jul. 2, 2005 and assigned Ser. No. 2005-59495, the contents of which are incorporated herein by reference.

BACKGROUND OF THE INVENTION

1. Field of the Invention

The present invention relates generally to a communication system, and in particular, to an authentication system and a method thereof in a communication system.

2. Description of the Related Art

Communication systems are being developed to provide users with service having various levels of Quality of Service (QoS). There are ongoing studies for supporting high-speed service by ensuring mobility and QoS in a Broadband Wireless Access (BWA) communication system such as Wireless Local Area Network (WLAN) and Wireless Metropolitan Area Network (WMAN). Institute of Electrical and Electronics Engineers (IEEE) 802.16a/d and IEEE 802.16e are such major systems.

With reference to FIG. 1, authentication, particularly by the twice Extensible Authentication Protocol (EAP) in a typical IEEE 802.16e communication system will be described herein. For notational simplicity, the twice EAP is called 'EAP-in-EAP' and an operation mode by EAP-in-EAP is called 'EAP-in-EAP mode'.

FIG. 1 is a diagram illustrating a signal flow for EAP-in-EAP authentication in a typical IEEE 802.16e communication system.

Referring to FIG. 1, the IEEE 802.16e communication system includes a Mobile Station (MS) 100, a Base Station (BS) 140, and an Authorization, Authentication, and Accounting (AAA) server 180. Since the IEEE 802.16e communication system operates in EAP-in-EAP, it authenticates in the twice EAP scheme. For convenience sake, authentication based on the EAP scheme is referred to as 'EAP authentication'. The first of the two EAP authentications is device authentication 120 and the second is user authentication 160 after the first EAP authentication is successful.

When device authentication is required, the BS 140 transmits an EAP-REQUEST/IDENTITY message to the MS 100, requesting EAP authentication. Because EAP messages are exchanged between the MS 100 and the BS 140 by Privacy Key Management (PKM)_EAP_TRANSFER in the IEEE 802.16e system, the BS 140 transmits a PKM_EAP/EAP-REQUEST/IDENTITY message to the MS 100 in step 101. The MS 100 replies by transmitting a PKM_EAP/EAP-RESPONSE/IDENTITY message in step 103.

The BS 140 forwards the PKM_EAP-EAP-RESPONSE/IDENTITY message to the AAA server 180. EAP messages are exchanged between the BS 140 and the AAA server 180 by Remote Authentication Dial-In User Service (RADIUS) protocol messages or DIAMETER protocol messages. In the illustrated case of FIG. 1, RADIUS protocol messages are used between the BS 140 and the AAA server 180. Hence, the BS 140 transmits a RADIUS ACCESS REQUEST/IDENTITY message to the AAA server 180 in step 105.

The AAA server 180 performs device authentication on the MS 100 by authenticating the PKM_EAP messages using EAP-Transport Level Security (TLS), EAP-Transport Level Security Pre-Shared Key (TLSPSK), EAP-Authentication and Key Agreement (AKA), or EAP-PSK in step 107. As a consequence of the device authentication, the AAA server 180 and the MS 100 share a Master Session Key (MSK) in steps 109 and 111.

The AAA server 180 transmits a RADIUS ACCEPT message as an EAP-SUCCESS message to the BS 140 in step 113. The RADIUS ACCEPT message includes the MSK. In step 115, the BS 140 transmit a PKM_EAP/EAP-SUCCESS message to the MS 100, notifying of the success of the EAP authentication.

In steps 117 and 119, the MS 100 and the BS 140 generate an EAP Integrity Key (EIK) and a Pairwise Master Key (PMK) from the MSK during the device authentication 120. The EIK generated created through the device authentication 120 is used to protect EAP messages transmitted during the second EAP authentication, i.e. the user authentication 160.

During the user authentication 160, the BS 140 transmits a PKM_EAP/EAP-REQUEST/IDENTITY message to the MS 100 when the user authentication is needed, in step 161. The MS 100 replies by transmitting a PKM_EAP/EAP-RESPONSE/IDENTITY message in step 163.

In step 165, the BS 140 converts the PKM_EAP/EAP-RESPONSE/IDENTITY message in the form of a RADIUS ACCESS REQUEST/IDENTITY message and transmits it to the AAA server 180.

The AAA server 180 performs user authentication on the MS 100 by authenticating the PKM_EAP messages using EAP-Message-DigestS (MD5) or EAP-Microsoft Challenge Authentication Protocol version 2 (MSCHAPv2) in step 167. Unlike the device authentication 120, no additional MSK is generated even when the user authentication is completed. Meanwhile, upon reception of a RADIUS ACCEPT message in step 169, the BS 140 transmits a PKM_EAP/EAP-SUCCESS message to the MS 100 in step 171. In steps 173 and 175, the MS 100 and the BS 140 generate an Authorization Key (AK) using the PMK. The creation of the AK will be described later in more detail with reference to FIG. 2.

As described above, in EAP-in-EAP authentication of the IEEE 802.16e communication system, an MSK is generated during the first EAP authentication only.

FIG. 2 is a flowchart illustrating a creation procedure for an AK in the typical IEEE 802.16e communication system. This operation takes place in the MS and the BS each and the creation of the AK will be described herein in the context of the BS.

Referring to FIG. 2, the BS receives an MSK generated during the first EAP authentication, i.e. the device authentication from the AAA server in step 211 and generates an EIK and a PMK using the MSK in step 213. Specifically, the BS generates an EIK and a PMK with a predetermined number of bits, for example, a 160-bit EIK and a 160-bit PMK by truncating the MSK.

In step 215, the BS generates an AK by applying the PMK to a predetermined function. Specifically, the BS uses the PMK in a Dot16KDF function, for example. The Dot16KDF function is expressed set forth in Equation (1) below as $$AK = Dot16KDF(PMK, SSID|BSID| \text{'}AK\text{'}, 160) \qquad (1)$$

where SSID is the Identifier (ID) of the MS for which the EAP authentication is performed, BSID is the ID of the BS, 'AK' is the AK created by the Dot16KDF, and 160 denotes the length of the AK, 160 bits. Hence, the Dot16KDF function generates a 160-bit AK using the PMK and a parameter of the SSID and the BSID in concatenation.

FIG. 3 is a diagram illustrating a signal flow for a Security Association & Traffic Encryption Key (SA-TEK) 3way handshake procedure for EAP-in-EAP authentication in the typical IEEE 802.16e communication system.

Referring to FIG. 3, the IEEE 802.16e communication system includes an MS 300, an adversary MS (ADV) 320, a BS 340, and an AAA server 360. The MS 300 and the BS 340 are normal devices/users, and the ADV 320 is an adversary device/user which has a valid key for the first EAP authentication and intercepts an EAP message from the MS 300 during the second EAP authentication.

The first EAP authentication is performed among the MS 300, the BS 340, and the AAA server 360 in the manner illustrated with reference to FIG. 1 in step 311. In steps 313 and 315, thus, the MS 300 and the BS 340 acquire an EIK ($EIK_{MS}$) and a PMK ($PMK_{MS}$).

Meanwhile, the ADV 320 also performs the EAP authentication with the BS 340 and the AAA server 360 in step 317. In steps 319 and 321, thus, the ADV 320 and the BS 340 acquire an EIK ($EIK_{ADV}$) and a PMK ($PMK_{ADV}$).

When user authentication is needed, the BS 340 then transmits a PKM_EAP/EAP-REQUEST/IDENTITY message to both the MS 300 and the ADV 320 in steps 323 and 325. The MS 300 replies by transmitting a PKM_EAP/EAP-RESPONSE/IDENTITY message in step 327. The ADV 320 monitors the PKM_EAP/EAP-RESPONSE/IDENTITY message, copies it, and transmits the copy using $EIK_{ADV}$ in step 329.

Upon reception of the PKM_EAP/EAP-RESPONSE/IDENTITY messages from the MS 300 and the ADV 320, the BS 340 converts the PKM_EAP/EAP-RESPONSE/IDENTITY messages in the form of RADIUS REQUEST/IDENTITY messages and forwards them to the AAA server 360 in steps 331 and 333.

The AAA server 360 transmits ACCESS CHALLENGE messages to the MS 300 and the ADV 320 in steps 335 and 337. The ACCESS CHALLENGE messages each include authentication parameters for access attempt, CHALLENGE AND SECRETE.

The MS 300 generates a parameter VALUE using CHALLENGE and SECRETE included in the ACCESS CHALLENGE message. VALUE is created by a predetermined function, for example, an MD5 function expressed as set forth below in Equation (2):

$$VALUE = MD5(ID, SECRET, CHALLENGE) \qquad (2)$$

where ID represents the ID of the MS 300.

In step 341, the MS 300 transmits a PKM_EAP/EAP-RESPONSE/RESPONSE message including its ID and VALUE to the BS 340. However, the ADV 320 intercepts the PKM_EAP/EAP-RESPONSE/RESPONSE message and transmits a PKM_EAP/EAP-RESPONSE/RESPONSE message including the ID of the ADV 320 and VALUE created by the MS 300 using $EIK_{ADV}$ to the BS 340 in step 343.

The BS 340 then converts the PKM_EAP/EAP-RESPONSE/RESPONSE message received from the ADV 320 in the form of a RADIUS ACCESS REQUEST/RESPONSE message and forwards it to the AAA server 360 in step 345.

The AAA server 360 authenticates the ADV 320 using an ID, SECRET, and VALUE that it has in step 347. As the authentication is successful, the AAA server 360 transmits a RADIUS ACCEPT message notifying of the successful EAP authentication to the BS 340 in step 349. In step 351, thus, the ADV 320 succeeds in the EAP authentication when the SA-TEK 3-way handshake is performed among the ADV 320, the BS 340 and the AAA server 360. The phenomenon of the adversary device/user intercepting the AK of the normal device/user and performing EAP authentication is called Man-in-the-middle-attack.

As described above, because in EAP-in-EAP authentication, the typical IEEE 802.16e communication system generates an MSK during the first EAP authentication only and an AK is created using a PMK derived from the MSK, the man-in-the-middle-attack phenomenon takes place. As a result, a normal service is impossible to provide to a normal device/users, thereby decreasing the overall QoS of the system. Accordingly, there is a need for developing a new authentication method for eliminating the man-in-the-middle-attack phenomenon.

SUMMARY OF THE INVENTION

An object of the present invention is to substantially solve at least the above problems and/or disadvantages and to provide at least the advantages below. Accordingly, the present invention provides an EAP-in-EAP authentication system and method in a communication system. The present invention also provides a system and method for performing authentication reliably in EAP-in-EAP using double PMKs.

According to one aspect of the present invention, in an authentication system in a communication system, an MS acquires a first MSK by performing a first EAP authentication being device authentication in an EAP-in-EAP scheme with a BS and an AAA server, and acquires a second MSK by performing a second EAP authentication being user authentication in the EAP-in-EAP scheme with the 135 and the AAA server, after the first EAP authentication. The AAA server acquires the first MSK by performing the first EAP authentication with the MS and the BS and acquires the second MSK by performing the second EAP authentication with the MS and the 135. The BS acquires the first MSK by performing the first EAP authentication with the MS and the AAA server and acquires the second MSK by performing the second EAP authentication with the MS and the AAA server.

According to another aspect of the present invention, in an authentication method in a communication system, a first MSK is acquired by a first EAP authentication for an MS in an EAP-in-EAP scheme by the MS, a BS, and an AAA server. The first EAP authentication is device authentication. A second MSK is acquired by a second EAP authentication for the MS in the EAP-in-EAP scheme by the MS, the BS and the AAA server, after the first EAP authentication. The second EAP authentication is user authentication.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an authentication system and method in a communication system, for example, an Institute of Electrical and Electronics Engineers (IEEE) 802.16e system. Particularly, the present invention is directed to a system and method for twice Extensible Authentication Protocol (EAP) authentication called EAP-in-EAP authentication. Here, an operation mode in EAP-in-EAP is called an EAP-in-EAP mode. While the present invention will be described in the context of the IEEE 802.16e communication system for convenience sake, it is to be clearly understood that the present invention is applicable to any other communication system.

Figure 1:
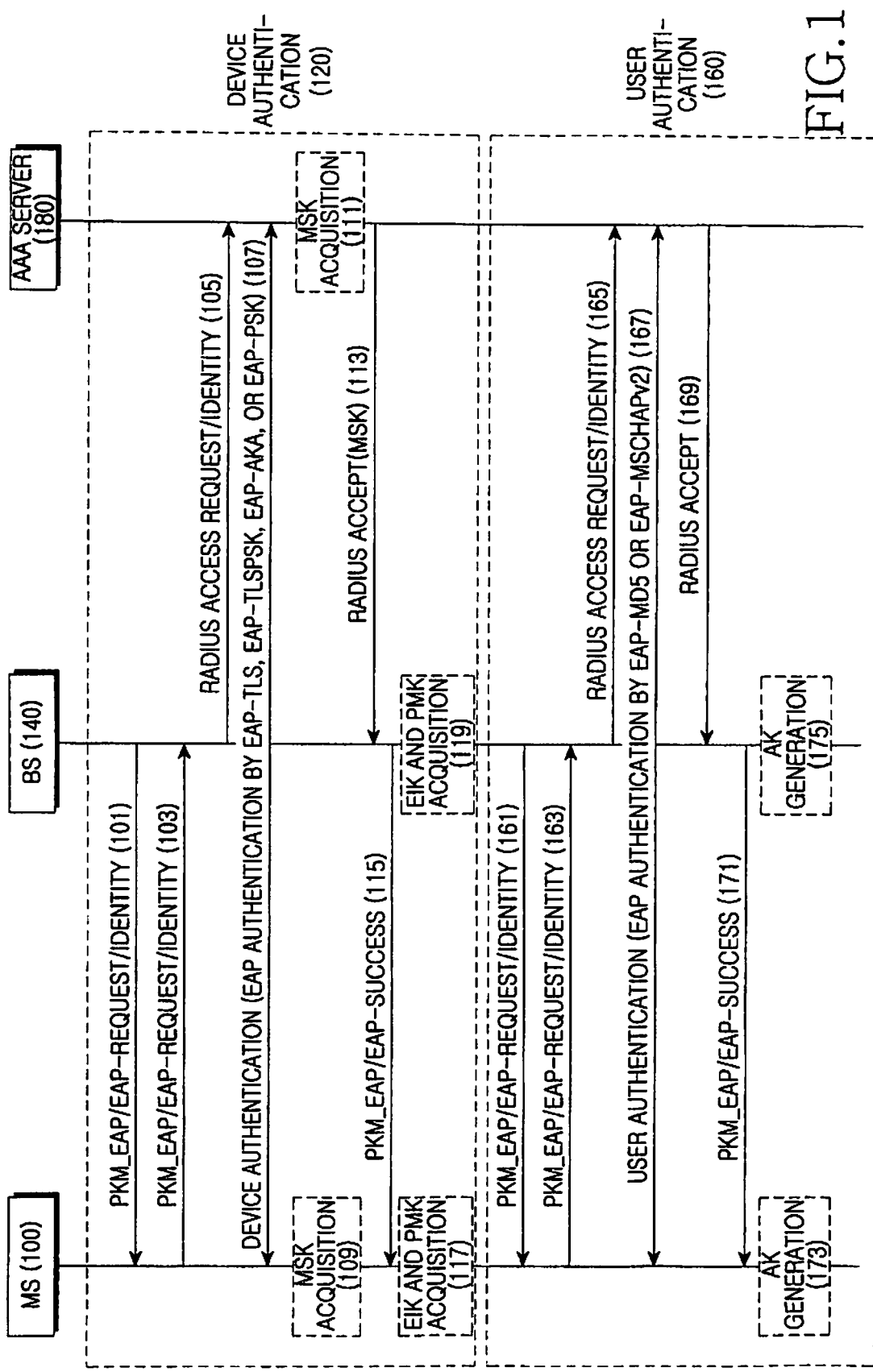
FIG. 1 is a diagram illustrating a signal flow for EAP-in-EAP authentication in a typical IEEE 802.16e communication system.
Figure 2:
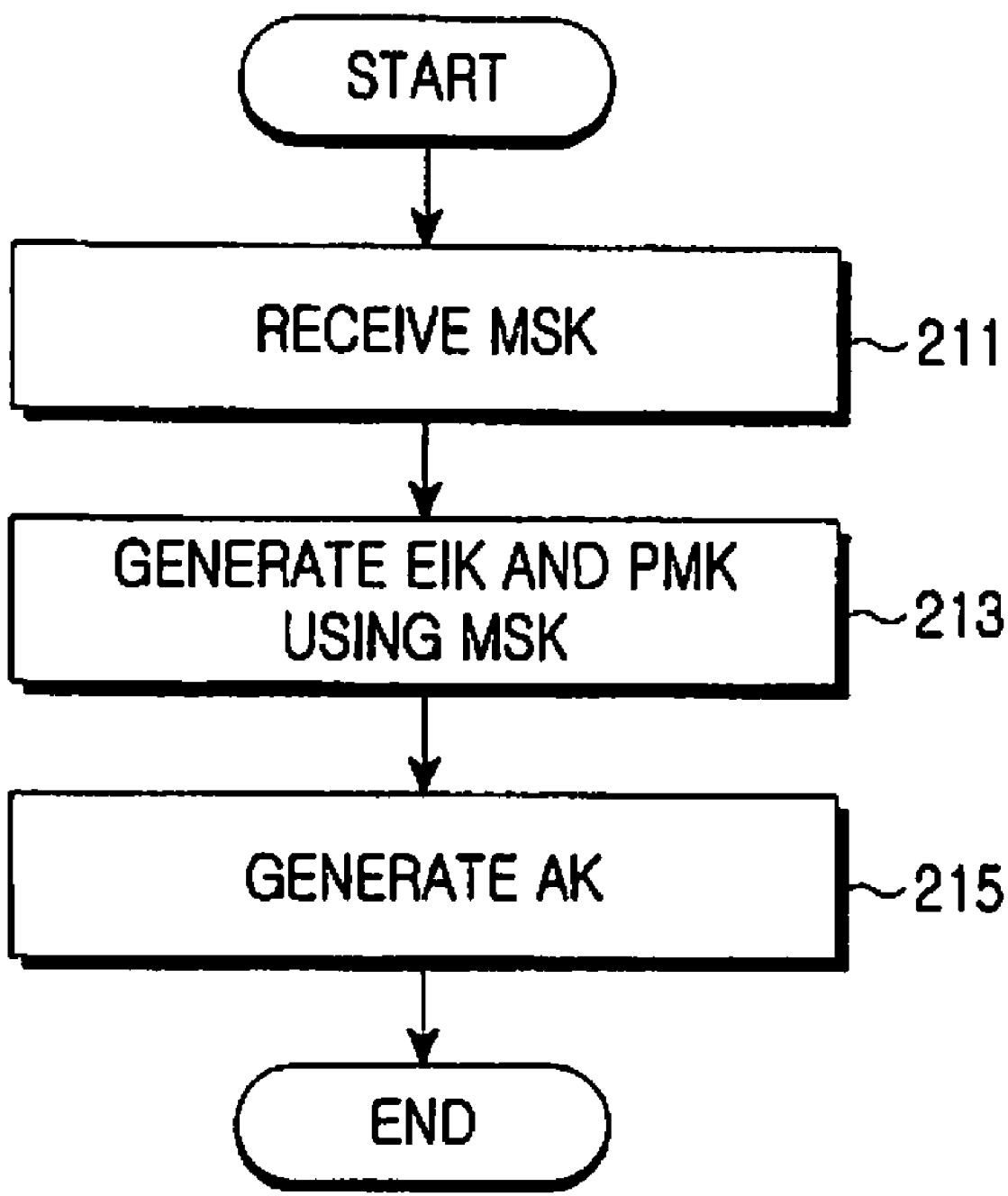
FIG. 2 is a flowchart illustrating an AK generating operation in the typical IEEE 802.16e communication system.
Figure 3:
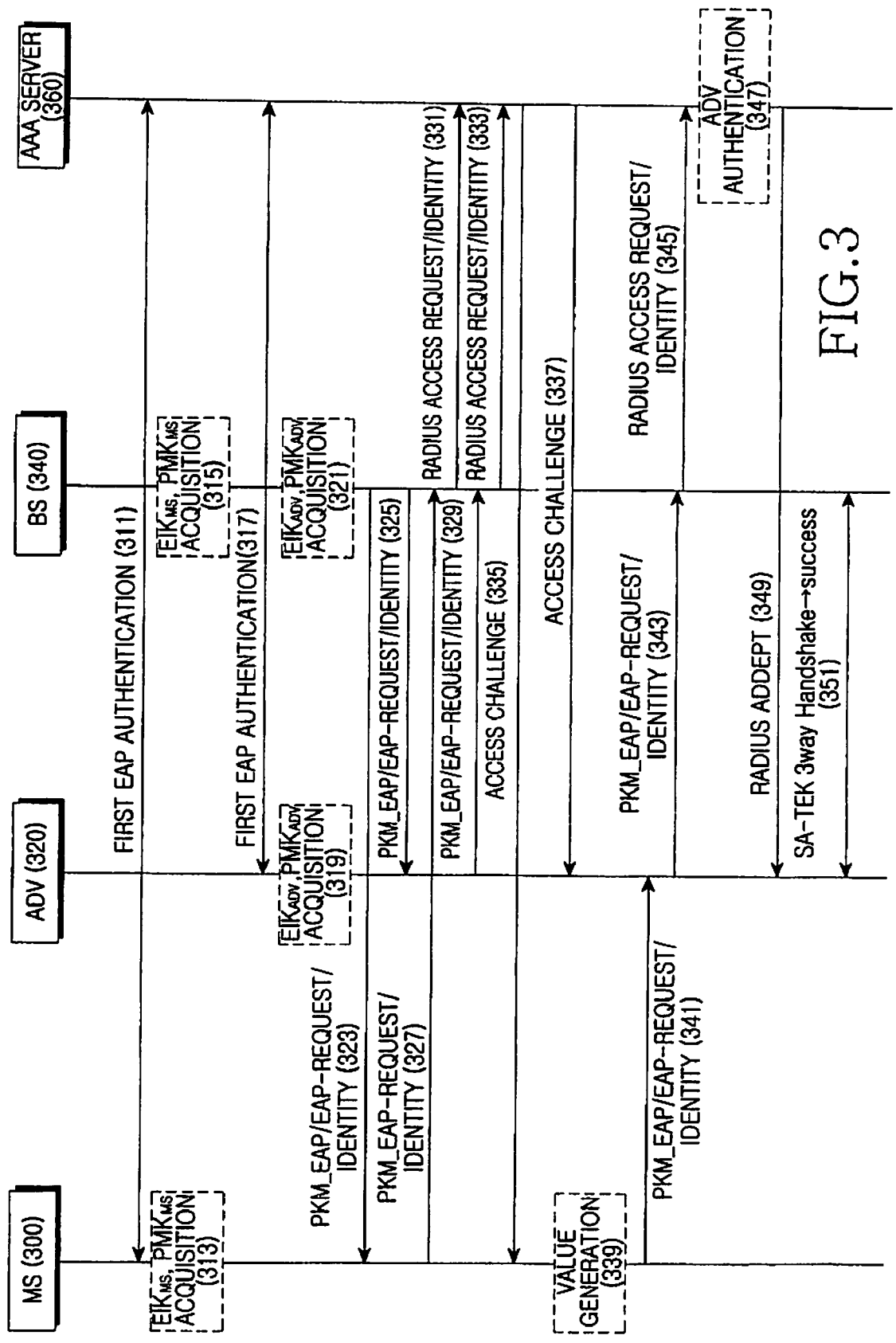
FIG. 3 is a diagram illustrating a signal flow for an SA-TEK 3way handshake procedure in the EAP-in-EAP authentication in the typical IEEE 802.16e communication system.
Figure 4:
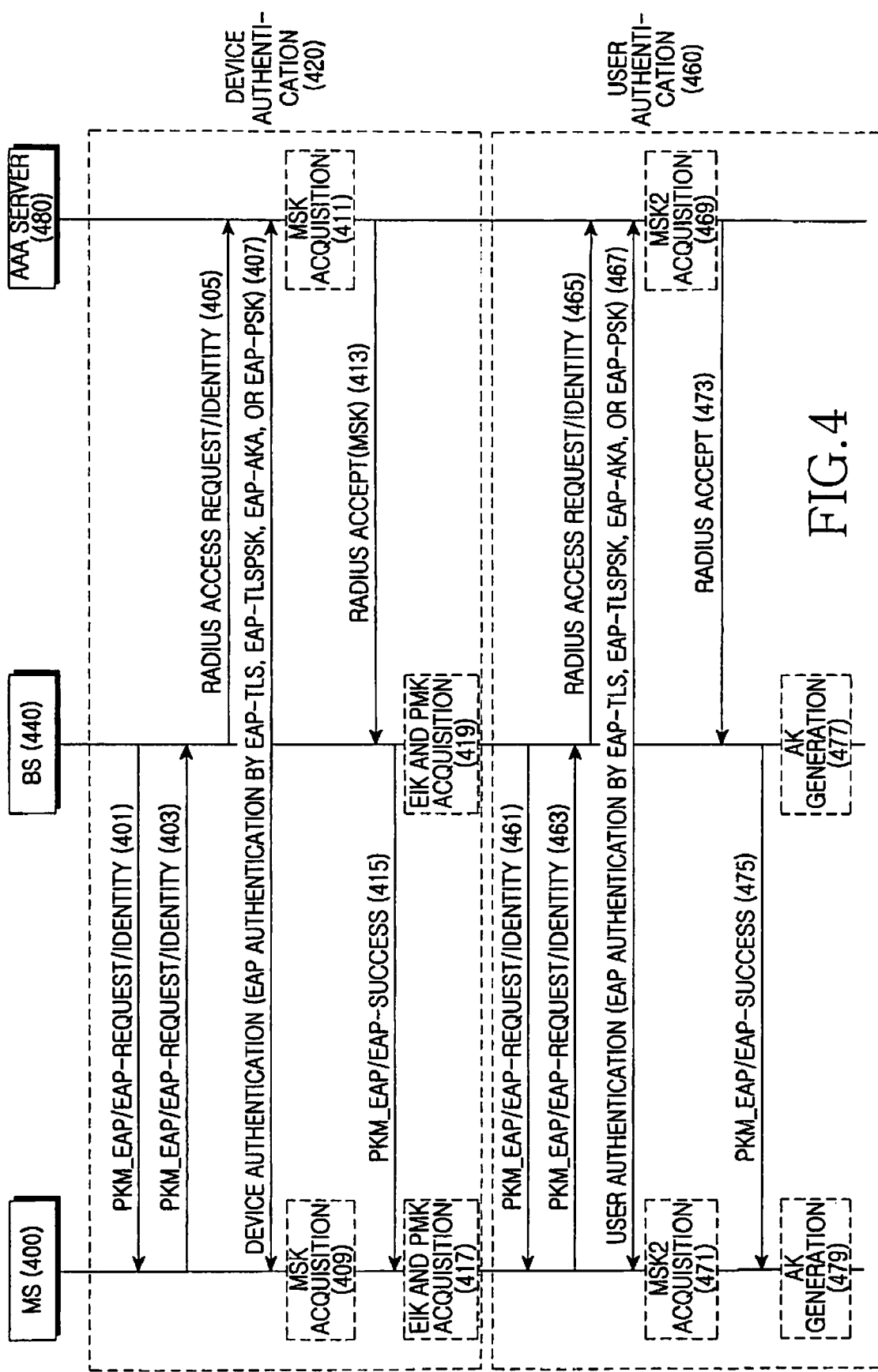
FIG. 4 is a diagram illustrating a signal flow for EAP-in-EAP authentication using double PMKs in an IEEE 802.16e communication system according to the present invention.

FIG. 4 is a diagram illustrating a signal flow for EAP-in-EAP authentication using double Pairwise Master Keys (PMKs) in an IEEE 802.16e communication system according to the present invention.

Referring to FIG. 4, the IEEE 802.16e communication system includes a Mobile Station (MS) 400, a Base Station (BS) 440, and an Authorization, Authentication, and Accounting (AAA) server 480. Since the IEEE 802.16e communication system operates in EAP-in-EAP, it performs double authentications. For convenience sake, authentication based on the EAP scheme is referred to as 'EAP authentication'. The first of the two EAP authentications is device authentication 420 and the second is user authentication 460 performed after the first EAP authentication is successful.

When device authentication 420 is required, the BS 440 transmits an EAP-REQUEST/IDENTITY message to the MS 400, requesting EAP authentication. Because EAP messages are exchanged between the MS 400 and the BS 440 by Privacy Key Management (PKM)_EAP_TRANSFER in the IEEE 802.16e system, the BS 440 transmits a PKM_EAP/EAP-REQUEST/IDENTITY message to the MS 400 in step 401.

The MS 400 then replies by transmitting a PKM_EAP/EAP-RESPONSE/IDENTITY message in step 403.

The BS 440 forwards the PKM_EAP-EAP-RESPONSE/IDENTITY message to the AAA server 480. EAP messages are exchanged between the BS 440 and the AAA server 480 by Remote Authentication Dial-In User Service (RADIUS) protocol messages or DIAMETER protocol messages. In the illustrated case of FIG. 4, RADIUS protocol messages are used between the BS 440 and the AAA server 480. Hence, the BS 440 transmits a RADIUS ACCESS REQUEST/IDENTITY message to the AAA server 480 in step 405.

The AAA server 480 performs device authentication on the MS 400 by authenticating the PKM_EAP message using EAP-Transport Level Security (TLS), EAP-Transport Level Security Pre-Shared Key (TLSPSK), EAP-Authentication and Key Agreement (AKA), or EAP-PSK in step 407. As a consequence of the device authentication, the AAA server 480 and the MS 400 share a Master Session Key (MSK) in steps 409 and 411.

The AAA server 480 transmits a RADIUS ACCEPT message as EAP-SUCCESS message to the BS 440 in step 413. The RADIUS ACCEPT message includes the MSK. In step 415, the BS 440 transmits a PKM_EAP/EAP-SUCCESS message to the MS 400, notifying the success of the EAP authentication. In step 417, the BS 440 generates an EAP Integrity Key (EIK) and a Pairwise Master Key (PMK) from the MSK.

The EIK is used to protect EAP messages transmitted during the second EAP authentication, i.e. the user authentication 460. Then the user authentication 460 follows the device authentication 420.

The BS 440 transmits a PKM_EAP/EAP-REQUEST/IDENTITY message to the MS 400 when the user authentication is needed, in step 461. The MS 400 replies with a PKM_EAP/EAP-RESPONSE/IDENTITY message in step 463.

In step 465, the BS 440 converts the PKM_EAP/EAP-RESPONSE/IDENTITY message in the form of a RADIUS ACCESS REQUEST/IDENTITY message and forwards it to the AAA server 480.

The AAA server 480 performs user authentication on the MS 400 by authenticating the PKM_EAP message using EAP-TLS, EAP-RLSPSK, EAP-AKA, or EAP-PSK in step 467. Thus, the AAA server 480 and the MS 400 share a second MSK, MSK2 as the user authentication is completed in steps 469 and 471. Thereby two MSKs, including MSK and MSKare created during the device authentication and the user authentication, respectively in the EAP-in-EAP authentication of the present invention.

In step 473, the AAA server 480 transmits a RADIUS ACCEPT message to the BS 440, notifying of the success of the EAP authentication. The BS 440 then transmits a PKM_EAP/EAP-SUCCESS message to the MS 100 in step 475. Through the user authentication 460, the BS 440 generates a second PMK, PMK2 from MSK2 and generates an Authorization Key (AK) using PMK and PMK2 in step 477. The AK creation from PMK and PMK2 in the MS 400 and the BS 440 will be described in more detail with reference to FIG. 5.

Figure 5:
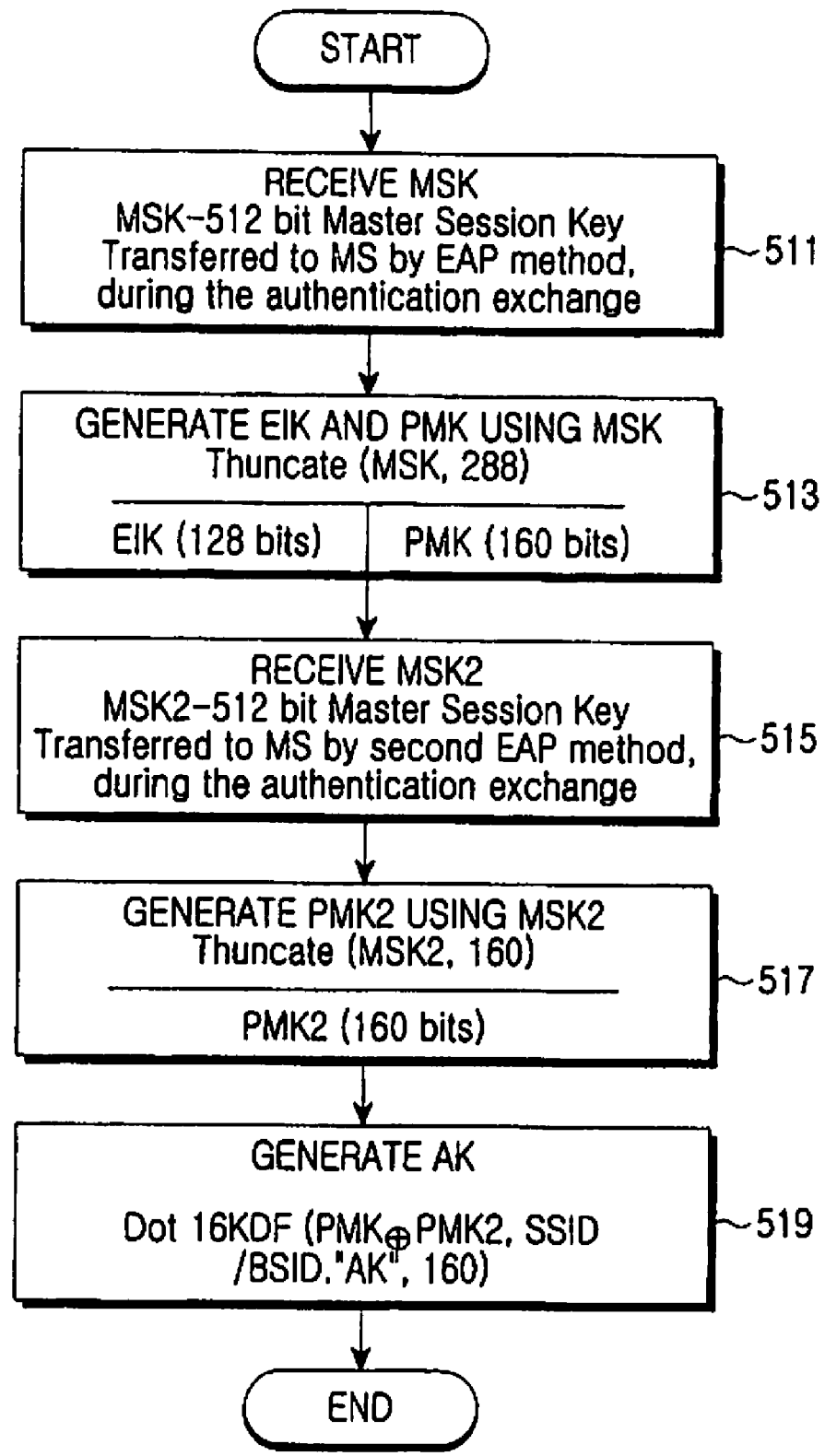
FIG. 5 is a flowchart illustrating a procedure for generating an AK in the IEEE 802.16e communication system according to the present invention.

FIG. 5 is a flowchart illustrating a procedure for generating the AK in the IEEE 802.16e communication system according to the present invention. This procedure takes place in both the MS and the generation of the BS and the AK will be described herein in the context of the BS.

Referring to FIG. 5, the BS acquires an MSK by the first EAP authentication, i.e. the device authentication in step 511 and generally creates an EIK and a PMK using the MSK in step 513. Specifically, the BS generates the EIK and the PMK with a predetermined number of bits, for example, a 160-bit EIK and a 160-bit PMK by truncating the MSK.

In step 515, the BS acquires a second MSK, MSK2 through the second EAP authentication, i.e. the user authentication. The BS generates a second PMK PMK2, for example, a 160-bit PMK2 by truncating MSK2 in step 517.

The BS generates an AK by applying PMK and PMK2 to an AK generation function. Specifically, the BS uses PMK and PMK2 in a Dot16KDF function, for example. The Dot16KDF function can be expressed as Equation. (3) or Equation. (4) below.

$$AK = \text{Dot16KDF}(PMK \oplus PMK2, SSID|BSID|'K', 160) \quad (3)$$

In Equation (3) above, SSID is the ID of the MS for which the EAP authentication is performed, BSID is the ID of the BS, 'AK' is the AK created by the Dot16KDF, and 160 denotes the length of the AK, 160 bits. Hence, the Dot16KDF function generates a 160-bit AK using an XOR of PMK and PMK2 and a parameter of the SSID and the BSID in concatenation.

$$AK=\text{Dot16KDF}(PMK, SSID|BSID|PMK2, \text{'}AK\text{'}, 160) \quad (4)$$

In Equation (4), above, SSID is the ID of the MS for which the EAP authentication is performed, BSID is the ID of the BS, 'AK' is the AK created by the Dot16KDF, and 160 denotes the length of the AK, 160 bits. Hence, the Dot16KDF function generates a 160-bit AK using PMK and a parameter of the SSID, the BSID, and PMK2 in concatenation.

As described above, an AK is generated using PMK resulting from the first EAP authentication and PMK2 resulting from the second authentication during EAP-in-EAP authentication using double PMKs in the IEEE 802.16e communication system according to the embodiment of the present invention. Therefore, the man-in-the-middle-attack phenomenon, which is encountered with the typical IEEE 802.16e communication system, can be eliminated.

Figure 6:
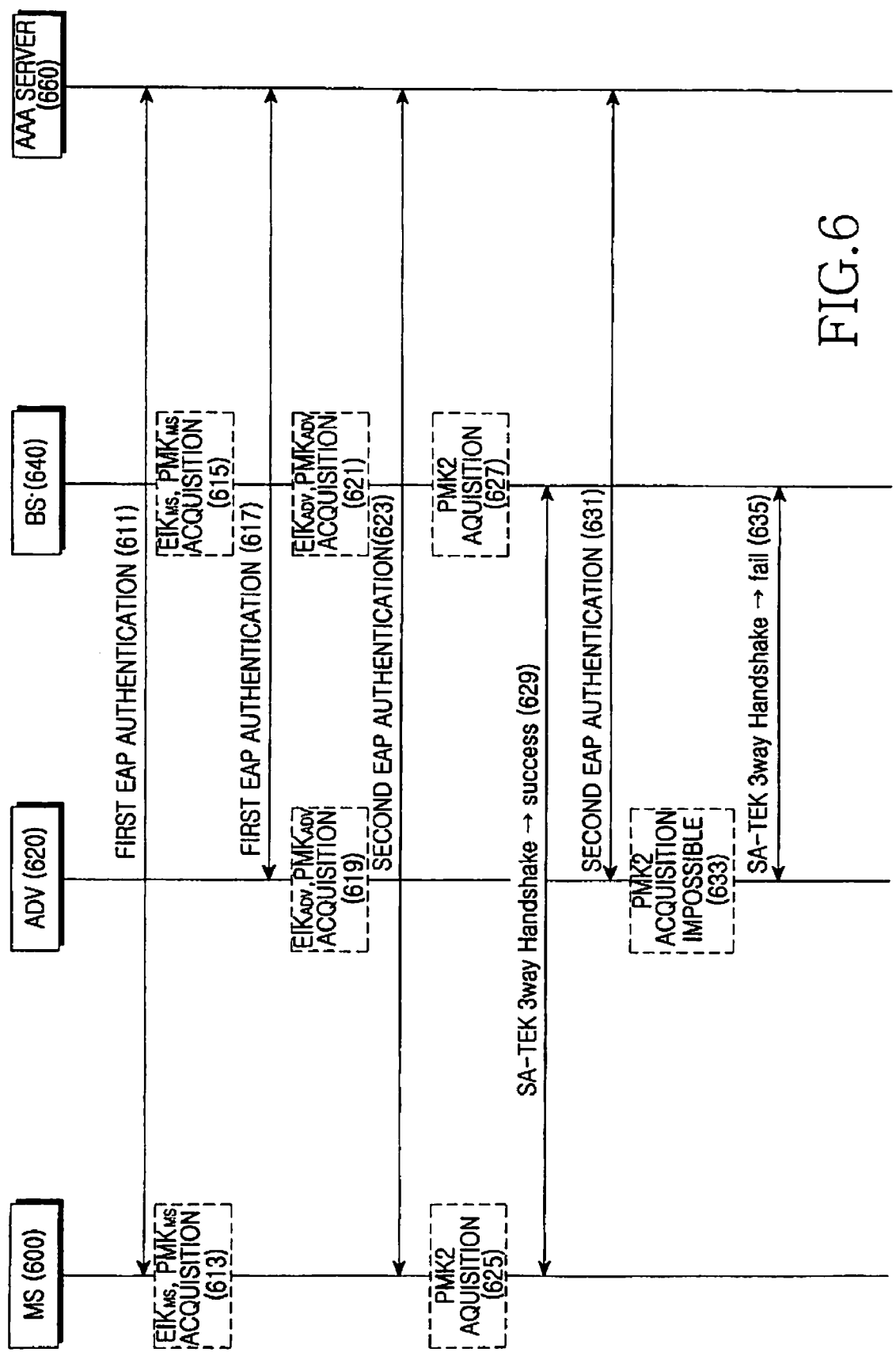
FIG. 6 is a diagram illustrating a signal flow for an SA-TEK 3way handshake procedure in the EAP-in-EAP authentication in the IEEE 802.16e communication system according to an embodiment of the present invention.

FIG. 6 is a diagram illustrating a signal flow for an Security Association & Traffic Encryption Key (SA-TEK) 3way handshake procedure in the EAP-in-EAP authentication in the IEEE 802.16e communication system according to the present invention.

Referring to FIG. 6, the IEEE 802.16e communication system includes an MS 600, an adversary MS (ADV) 620, a BS 640, and an AAA server 660. The MS 600 and the BS 640 are normal devices/users, and the ADV 620 is an adversary device/user which has a valid key for the first EAP authentication and intercepts an EAP message from the MS 600 during the second EAP authentication.

The first EAP authentication is performed among the MS 600, the BS 640, and the AAA server 660 in the procedure illustrated in FIG. 4 in step 611. In steps 613 and 615, thus, the MS 600 and the BS 640 acquire an EIK ($EIK_{MS}$) and a PMK ($PMK_{MS}$)

Meanwhile, the ADV 620 also performs the EAP authentication with the BS 640 and the AAA server 660 in step 617. In steps 619 and 621, thus, the ADV 620 and the BS 640 acquire an EIK ($EIK_{ADV}$) and a PMK ($PMK_{ADV}$).

After the first EAP authentication, the second EAP authentication is performed among the MS 600, the BS 640, and the AAA server 660 in the procedure illustrated in FIG. 4, in step 623. Thus, the MS 600 and the BS 640 acquire another PMK, $PMK2_{MS}$ through the second EAP authentication in steps 625 and 627. The MS 600 can generate an AK using $PMK_{MS}$ and $PMK2_{MS}$.

Therefore, when an SA-TEK 3-way handshake is performed between the MS 600 and the BS 640, the MS 600 succeeds in SA-TEK 3way handshake using the AK in step 629.

After the first EAP authentication, the second EAP authentication is also performed between the ADV 620, the BS 640, and the AAA server 660 in step 631. However, since the ADV 620 is an adversary device/user, it cannot acquire PMK2 in step 633. As a consequence, the ADV 620 cannot generate the AK.

Therefore, when an SA-TEK 3way handshake is performed between the ADV 620 and the BS 640, the ADV 620 fails in SA-TEK 3way handshake because it cannot generate the AK in step 635.

As described above, the present invention increases the authentication reliability of EAP-in-EAP authentication in an IEEE 802.16e communication system because an AK is generated using double PMKs, that is, PMK and PMK2. The resulting elimination of the main-in-the-middle-attack phenomenon improves overall system performance.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An authentication method in a communication system, comprising:

acquiring a first master session key (MSK) by a first Extensible Authentication Protocol (EAP) authentication for a mobile station (MS) in an EAP-in-EAP scheme by the MS, a base station (BS), and an authorization, authentication and accounting (AAA) server;

acquiring a second MSK by a second EAP authentication for the MS in the EAP-in-EAP scheme by the MS, the BS and the AAA server, after the first EAP authentication; and generating an authorization key (AK) using the first MSK and the second MSK by the MS and the BS;

wherein generating the AK comprises generating a first pairwise master key (PMK) using the first MSK, generating a second PMK using the second MSK, and generating the AK using the first PMK and the second PMK.

2. The authentication method of claim 1, wherein generating the first PMK generation step comprises generating the first PMK by truncating the first MSK.

3. The authentication method of claim 2, wherein generating the second PMK comprises truncating the second MSK.

4. The authentication method of claim 3, wherein the step of generating the AK using the first PMK and the second PMK comprises generating the AK using an XOR of the first PMK and a second PMK and a concatenation of the identifier (ID) of the MS and the ID of the BS.

5. The authentication method of claim 3, wherein the step of generating the AK using the first PMK and the second PMK comprises generating the AK by applying the first PMK and the second PMK to $$AK=\text{Dot16KDF}(PMK \oplus PMK2, SSID|BSID|\text{'}AK\text{'}, 160)$$

where Dot 16KDF is an AK generation function, PMK is the first PMK, PMK2 is the second PMK, SSID is the ID of the MS, BSID is the ID of the BS, 'AK' is the AK generated by the Dot 16KDF, and 160 denotes the length of the AK, 160 bits.

6. The authentication method of claim 3, wherein generating the AK using the first PMK and the second PMK comprises generating the AK using the first PMK and a concatenation of the second PMK, the ID of the MS, and the ID of the BS.

7. The authentication method of claim 3, wherein generating the AK using the first PMK and the second PMK comprises generating the AK by applying the first PMK and the second PMK to $$AK=\text{Dot16KDF}(PMK, SSID|BSID|PMK2, \text{'}AK\text{'}, 160)$$

where Dot 16KDF is an AK generation function, PMK is the first PMK, PMK2 is the second PMK, SSID is the ID of the MS, BSID is the ID of the BS, 'AK' is the AK generated by the Dot 16KDF, and 160 denotes the length of the AK, 160 bits.

8. An authentication system in a communication system, comprising:

a mobile station (MS) for acquiring a first master session key (MSK) by performing a first Extensible Authentication Protocol (EAP) authentication in an EAP-in-EAP scheme with a base station (BS) and an authorization, authentication and accounting (AAA) server, and acquiring a second MSK by performing a second EAP authentication in the EAP-in-EAP scheme with the BS and the AAA server, after the first EAP authentication;

the AAA server for acquiring the first MSK by performing the first EAP authentication with the MS and the BS and acquiring the second MSK by performing the second EAP authentication with the MS and the BS; and the BS for acquiring the first MSK by performing the first EAP authentication with the MS and the AAA server and acquiring the second MSK by performing the second EAP authentication with the MS and the AAA server;

wherein the MS and the BS generate an authorization key (AK) using the first MSK and the second MSK; and wherein the MS and the BS generate a first pairwise master key (PMK) using the first MSK, generate a second PMK using the second MSK, and generate the AK using the first PMK and the second PMK.

9. The authentication system of claim 8, the MS and the BS generate the first PMK by truncating the first MSK.

10. The authentication system of claim 9, wherein the MS and the BS generate the second PMK by truncating the second MSK.

11. The authentication system of claim 10, wherein the MS and the BS generate the AK using an XOR of the first PMK and a second PMK and a concatenation of the identifier (ID) of the MS and the ID of the BS.

12. The authentication system of claim 10, wherein the MS and the BS generate the AK by applying the first PMK and the second PMK to $$AK=\text{Dot16}KDF(PMK \oplus PMK2, SSID|BSID|\text{'}AK\text{'}, 160)$$

where Dot 16KDF is an AK generation function, PMK is the first PMK, PMK2 is the second PMK, SSID is the ID of the MS, BSID is the ID of the BS, 'AK' is the AK created by the Dot 16KDF, and 160 denotes the length of the AK, 160 bits.

13. The authentication system of claim 10, wherein the MS and the BS generate the AK using the first PMK and a concatenation of the second PMK, the ID of the MS, and the ID of the BS.

14. The authentication system of claim 10, wherein the MS and the BS generate the AK by applying the first PMK and the second PMK to $$AK=\text{Dot16}KDF(PMK, SSID|BSID|PMK2\text{'}AK\text{'}, 160)$$

where Dot 16KDF is an AK generation function, PMK is the first PMK, PMK2 is the second PMK, SSID is the ID of the MS, BSID is the ID of the BS, 'AK' is the AK created by the Dot 16KDF, and 160 denotes the length of the AK, 160 bits.

15. The authentication method of claim 1, wherein the first authentication is device authentication, and the second authentication is user authentication.

16. The authentication system of claim 8, wherein the first authentication is device authentication, and the second authentication is user authentication.

* * * * *